US010957966B2

(12) United States Patent
Barkan et al.

(10) Patent No.: US 10,957,966 B2
(45) Date of Patent: Mar. 23, 2021

(54) WALL MOUNT FOR SCREENS WITH AN INTEGRATED ANTENNA

(71) Applicant: BARKAN MOUNTS LTD, Tel Aviv (IL)

(72) Inventors: Shahar Barkan, Tel-Aviv (IL); Yaacov Goldberg, Ramat Hasharon (IL); Shmuel Goldberg, Jerusalem (IL)

(73) Assignee: BARKAN MOUNTS LTD, Tel Aviv (IL)

( * ) Notice: Subject to any disclaimer, the term of this patent is extended or adjusted under 35 U.S.C. 154(b) by 284 days.

(21) Appl. No.: 15/889,254

(22) Filed: Feb. 6, 2018

(65) Prior Publication Data
US 2019/0245259 A1 Aug. 8, 2019

(51) Int. Cl.
H01Q 1/12 (2006.01)
H01Q 11/10 (2006.01)
H01Q 1/44 (2006.01)
A47B 97/00 (2006.01)
H01Q 1/24 (2006.01)
H01Q 13/08 (2006.01)
F16M 13/02 (2006.01)

(52) U.S. Cl.
CPC ......... H01Q 1/1221 (2013.01); A47B 97/001 (2013.01); F16M 13/022 (2013.01); H01Q 1/24 (2013.01); H01Q 1/44 (2013.01); H01Q 11/10 (2013.01); H01Q 13/085 (2013.01); F16M 2200/06 (2013.01)

(58) Field of Classification Search
CPC ...... H01Q 1/24; H01Q 1/1221; H01Q 13/085; H01Q 11/10; H01Q 1/44
See application file for complete search history.

(56) References Cited

U.S. PATENT DOCUMENTS

| 3,327,310 | A | 6/1967 | Bethune et al. |
| 4,727,598 | A | 2/1988 | Ehlers |
| 6,104,443 | A | 8/2000 | Adcock et al. |
| 6,320,555 | B1 | 11/2001 | Schadler |
| 7,567,212 | B2 | 7/2009 | Inoue et al. |
| 8,693,172 | B2 * | 4/2014 | Russell .............. F16M 11/2014 361/679.01 |
| 8,816,923 | B2 | 8/2014 | King et al. |
| 8,897,033 | B2 | 11/2014 | Slipy et al. |
| 10,103,427 | B1 | 10/2018 | Yang |
| 2005/0104797 | A1 * | 5/2005 | McCollum ............... H01Q 9/28 343/895 |
| 2009/0199246 | A1 | 8/2009 | Koch |
| 2009/0288123 | A1 | 11/2009 | Havlovick et al. |

(Continued)

FOREIGN PATENT DOCUMENTS

JP 2005123705 A * 5/2005
WO 2008/017902 A2 2/2008

(Continued)

Primary Examiner — Dameon E Levi
Assistant Examiner — Jennifer F Hu
(74) Attorney, Agent, or Firm — Soroker Agmon Nordman

(57) ABSTRACT

A wall mount kit for mounting a television screen on a wall, including a mounting base configured to be attached to the wall, a screen interface that is configured to be attached to a television screen, wherein the screen interface is connectable directly or indirectly to the mounting base; and wherein at least one part of the wall mount kit is designed to serve as part of the wall mount and also as an antenna.

12 Claims, 5 Drawing Sheets

(56) References Cited

U.S. PATENT DOCUMENTS

| | | | |
|---|---|---|---|
| 2010/0214192 A1* | 8/2010 | Chao | H01Q 9/28 |
| | | | 343/906 |
| 2012/0032062 A1* | 2/2012 | Newville | F16M 11/2092 |
| | | | 248/575 |
| 2015/0295316 A1* | 10/2015 | Mannan | H01Q 1/24 |
| | | | 343/700 MS |
| 2015/0333394 A1* | 11/2015 | Nash | H01Q 1/38 |
| | | | 343/702 |
| 2016/0255301 A1 | 9/2016 | Vadura | |
| 2016/0268673 A1 | 9/2016 | Majid et al. | |
| 2016/0375216 A1 | 12/2016 | Sun | |
| 2018/0220109 A1 | 8/2018 | Nakamura et al. | |

FOREIGN PATENT DOCUMENTS

| | | |
|---|---|---|
| WO | WO/2011/160648 | 12/2011 |
| WO | WO/2015/128888 | 9/2015 |

\* cited by examiner ial display (LCD) or light emitting diode (LED) technology. The newer screens are much lighter than the older CRT screens and can conveniently be hung directly on a wall with an appropriate mounting interface also referred to as a TV wall mount or wall mount.

WALL MOUNT FOR SCREENS WITH AN INTEGRATED ANTENNA

TECHNICAL FIELD

The present invention relates to a wall mount for holding television screens and more particularly to a wall mount having an integrated antenna.

BACKGROUND

In recent years the classic cathode ray tube (CRT) computer and television screens have generally been replaced by thin screens based on liquid crystal display (LCD) or light emitting diode (LED) technology. The newer screens are much lighter than the older CRT screens and can conveniently be hung directly on a wall with an appropriate mounting interface also referred to as a TV wall mount or wall mount.

Additionally, many television screens come with a built in decoder that can decode radio and/or television broadcasts (e.g. Digital Video Broadcasting—Terrestrial (DVB-T)). Typically to ensure proper reception an antenna may be mounted near the television screen, for example on the wall near the TV wall mount and connected by a cable to the television screen.

Typically both the TV wall mount and the antenna are made from metal (e.g. soft steel) and both need to be mounted on the wall at about the same location. However each one is designed differently and serves a different purpose so neither can be omitted.

A standard all mount cannot serve as an antenna since the metal structure is not designed to enhance/receive radio and/or TV reception and would result in limited reception.

SUMMARY

An aspect of an embodiment of the disclosure relates to a wall mount for supporting television screens in which the metal of the wall mount also serves as part of an antenna. Some of the parts of the wall mount may be designed to have a size and shape that enhances signal reception, while also serving the function required from them as part of the wall mount. Additionally, a flexible (e.g. coaxial) cable is attached to the part serving as the antenna's port to transfer a signal to the television screen.

In an exemplary embodiment of the disclosure, the part of the wall mount serving as the antenna is confined within the contour of the wall mount thus not increasing the volume of the wall mount with additional parts that are not needed for the wall mount while protruding therefrom to serve as an antenna.

The combination provides a few benefits, for example:

1. The user only needs to purchase a single product for installing a television screen and receiving television/radio transmissions instead of two products;
2. The user needs to perform a single installation instead of two installations;
3. Less space is consumed since one structure is mounted on the wall and serves both as a wall mount to support the television screen and as the antenna;
4. Reception is enhanced for a lower price per product since the metal of the wall mount also serves as the metal of the antenna.

There is thus provided according to an exemplary embodiment of the disclosure, a wall mount kit for mounting a television screen on a wall, comprising:

A mounting base configured to be attached to the wall;
A screen interface that is configured to be attached to a television screen;
Wherein the screen interface is connectable directly or indirectly to the mounting base; and
Wherein at least one part of the wall mount kit is designed to serve as part of the wall mount and also as an antenna.

In an exemplary embodiment of the disclosure, the mounting base is designed to serve as the antenna. Alternatively or additionally, the screen interface is connected by an arm to the mounting base and the arm is designed to serve as the antenna. Alternatively or additionally, the screen interface is connected by an arm to the mounting base and one of the mounting base, the screen interface or the arm are designed to serve as the antenna. Alternatively or additionally, part of the screen interface is designed to serve as the antenna.

In an exemplary embodiment of the disclosure, the antenna is confined within a frame in the wall mount kit. Optionally, the frame is cut to form a gap in the frame matching a gap in the antenna. In an exemplary embodiment of the disclosure, the frame and the antenna confined within the frame are both configured to be attached to the wall. Optionally, the antenna serves as an independent part of the wall mount kit. In an exemplary embodiment of the disclosure, the antenna includes a cable for providing a signal to the television screen. Optionally, the antenna is designed as a log-periodic tooth antenna. In an exemplary embodiment of the disclosure, the antenna is designed as a vivaldi antenna. Optionally, the part serving as the antenna is confined within the contour of the wall mount thus not increasing the volume of the wall mount with additional parts that are not needed for the wall mount, while protruding therefrom to serve as an antenna. In an exemplary embodiment of the disclosure, more than one part serves as an antenna. Optionally, the antenna part is made from a different metal than the rest of the wall mount. In an exemplary embodiment of the disclosure, the antenna part is made from a thicker or thinner metal than the rest of the wall mount.

There is further provided according to an exemplary embodiment of the disclosure, a method of assembling a wall mount kit, comprising:

Attaching a wall mount mounting base to the wall;
Coupling a screen interface to a television screen;
Connecting the screen interface directly or indirectly to the mounting base;
Wherein at least one part of the wall mount kit is designed to serve as part of the wall mount and also as an antenna.

In an exemplary embodiment of the disclosure, the screen interface is connected by an arm to the mounting base and one of the mounting base, the screen interface or the arm are designed to serve as the antenna. Optionally, the antenna is confined within a frame in the wall mount kit. In an exemplary embodiment of the disclosure, the frame is cut to form a gap in the frame matching a gap in the antenna.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale and element or part may be relatively larger or smaller than actually shown.

DETAILED DESCRIPTION

Figure 1:
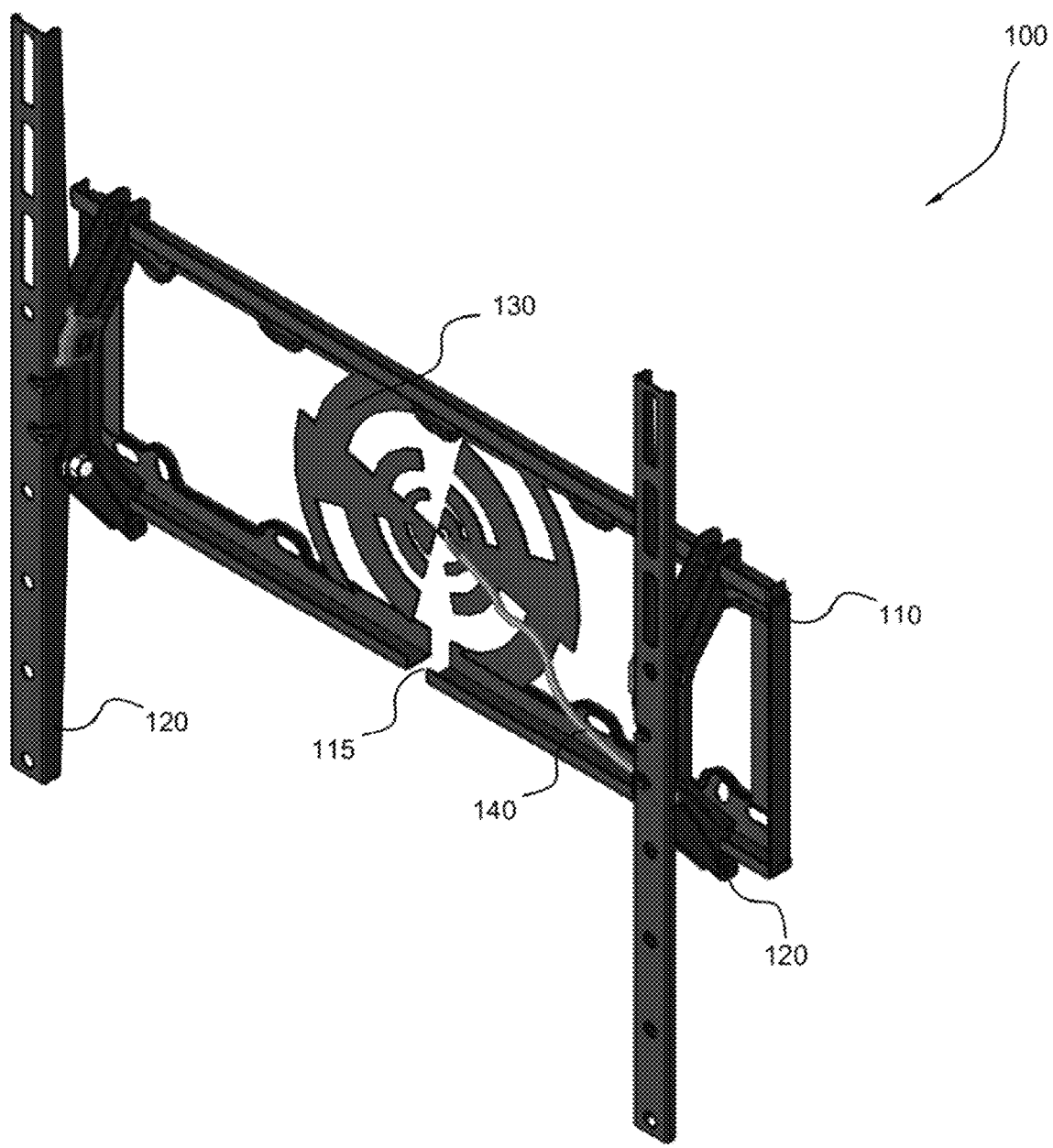
FIG. 1 is a schematic illustration of a wall mount that also serves as an antenna, according to an exemplary embodiment of the disclosure.

FIG. 1 is a schematic illustration of a wall mount 100 that also serves as an antenna, according to an exemplary embodiment of the disclosure. Wall mount 100 includes a mounting base (e.g. a wall Plate) 110 in the form of a frame that can be attached to a wall and one or more screen interfaces 120 that are provided to be connected to the back of a television screen to hang the television screen from mounting base 110.

In an exemplary embodiment of the disclosure, a metallic antenna design 130 is confined within the mounting base 110, so that it does not increase the size of the wall mount 100. Optionally, the antenna design 130 is cast or cut as an integral part of the mounting base 110 or it may be an independent piece of metal that is coupled to the mounting base 110 (e.g. with clips or screws). The antenna design 130 is shaped to provide optimal reception as an antenna for receiving television broadcasts and it may also provide structural strength to the mounting base 110. In some embodiments of the disclosure, the antenna design 130 is secured to the wall, for example with screws or nails through the antenna design 130 thus making the connection of the mounting base 110 to the wall more secure. Optionally, the mounting base 110 is formed from metal and it enhances reception of the antenna design 130 due to the contact of the metal of the mounting base 110 with the metal of the antenna design 130.

In an exemplary embodiment of the disclosure, the mounting base 110 serves as an integral part of the antenna and is cut forming a gap 115 in the frame of the mounting base 110 to enhance reception of the antenna, for example by matching a gap in the antenna design. Optionally, a cable 140 is attached to the antenna design 130, for example approximately at the center of the antenna design 130 to transfer signals received by the antenna design 130 to the television screen.

In summary, parts of the wall mount 100 are altered to serve also as an antenna, wherein the metal of the wall mount 100 enhances reception of the antenna, and the design of the antenna may enhance the strength of the structure of the wall mount 100. Likewise the design of the antenna is confined within the contour of the wall mount 100 so that the volume/size of wall mount is not enlarged as a result of also serving as an antenna.

Figure 2:
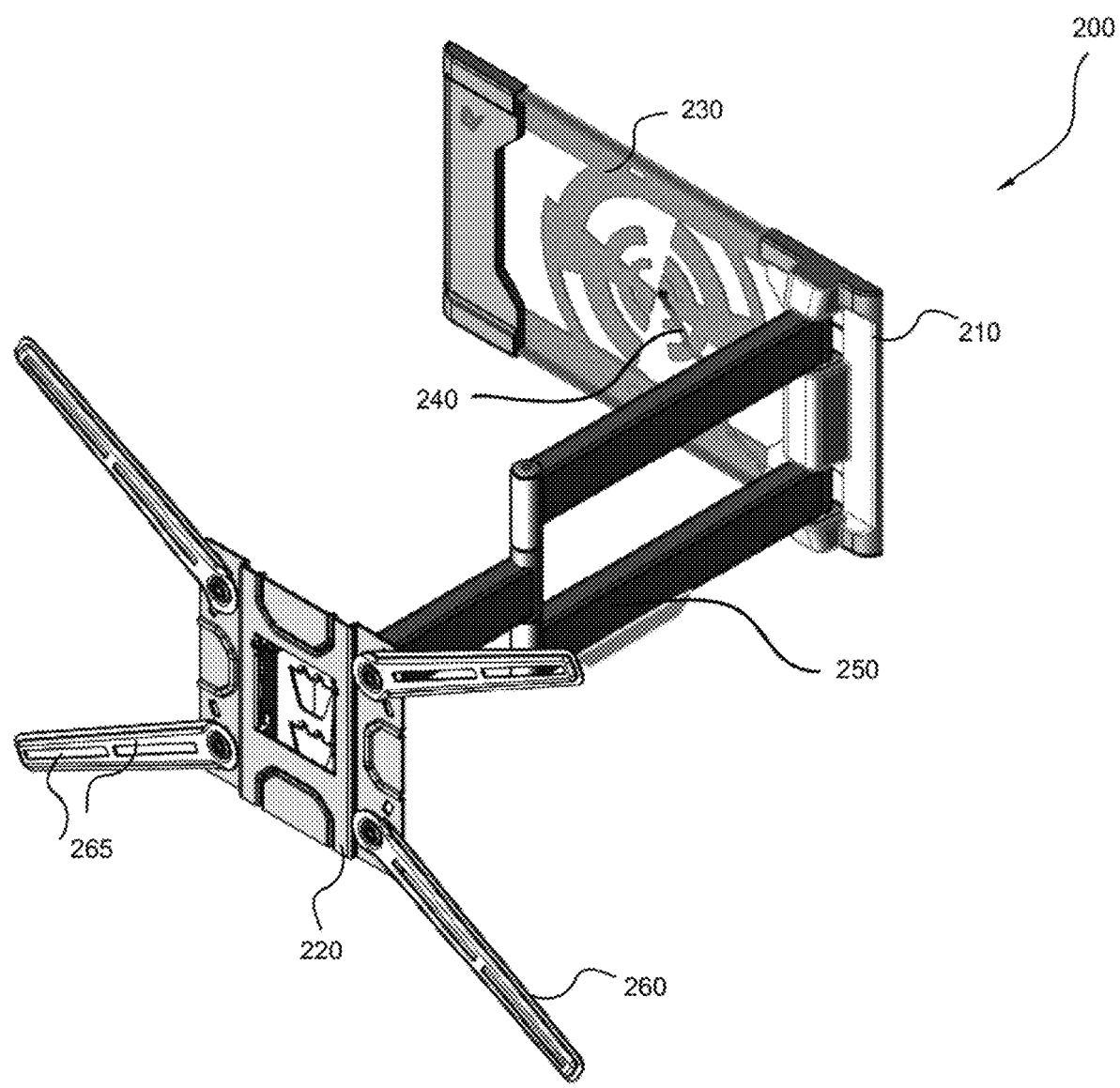
FIG. 2 is a schematic illustration of an alternative wall mount that also serves as an antenna, according to an exemplary embodiment of the disclosure.

FIG. 2 is a schematic illustration of a wall mount 200 that also serves as an antenna, according to an exemplary embodiment of the disclosure. Wall mount 200 is another example of a wall mount with an integrated antenna. Wall mount 200 includes a mounting base (e.g. a wall Plate) 210 in the form of a frame with an antenna design 230 integrated therein as in wall mount 100 (e.g. provided as an integral part or attached to the mounting base 210). Optionally, a cable 240 is attached to antenna design 230 (e.g. approximately at the center) to connect to the television screen.

In an exemplary embodiment of the disclosure, wall mount 200 includes a rotatable support arm 250 (e.g. with single or double joints) that extends from mounting base 210 to support the television screen and provide rotational freedom. Optionally, a screen interface plate 220 (e.g. a VESA Plate) is attached to an end of the rotatable support arm 250 with screen interface arms 260 rotatably attached to the screen interface plate 220 to hold the television screen. The screen interface arms 260 include slits 265 for positioning screws to couple the screen interface arms 260 to the television screen.

As with wall mount 100 the antenna design 230 is positioned in the frame of mounting base 210 to enhance stability of the wall mount 200 and to enhance reception of the antenna.

Figure 3:
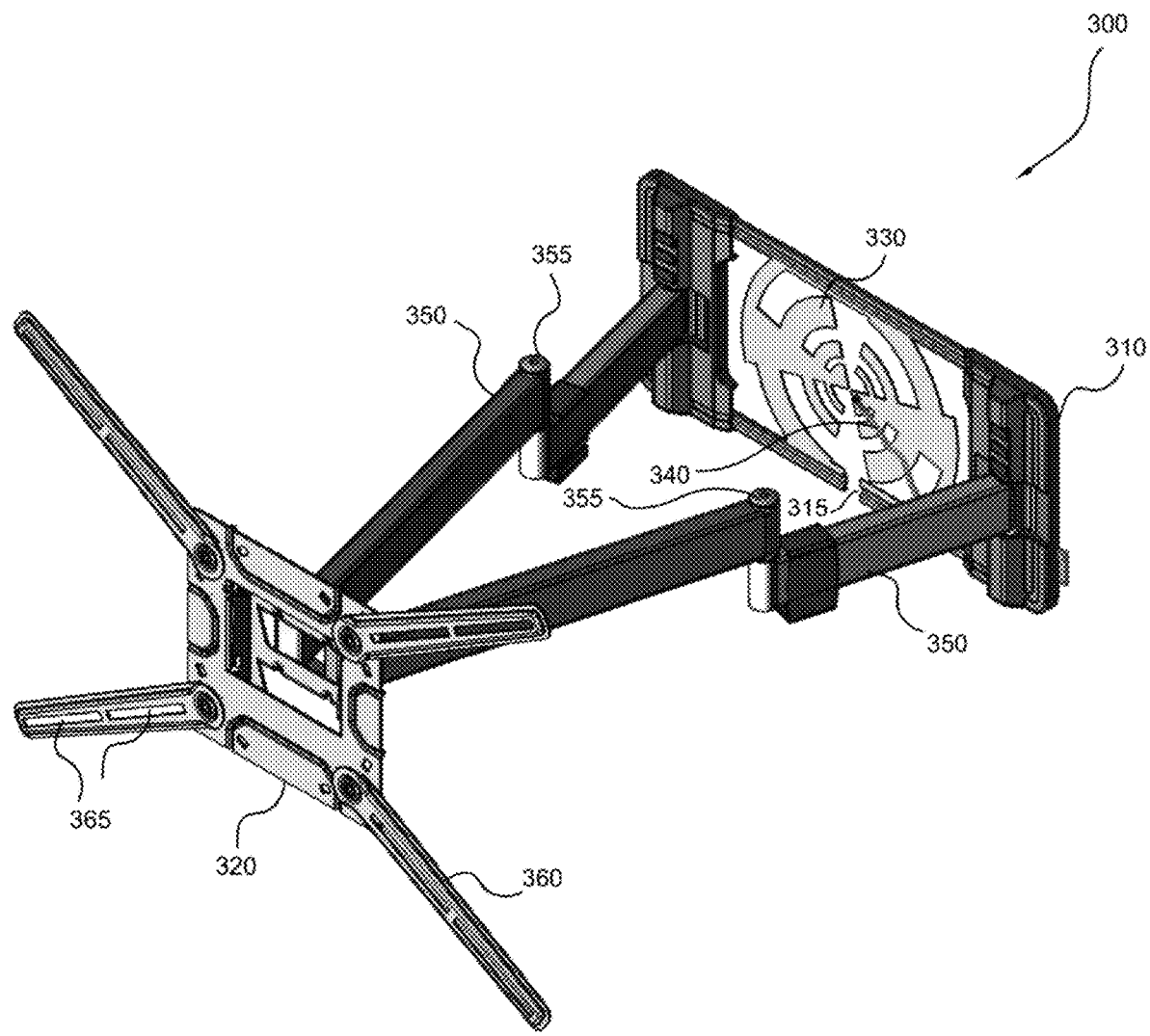
FIG. 3 is a schematic illustration of an alternative wall mount that also serves as an antenna, according to an exemplary embodiment of the disclosure.

FIG. 3 is a schematic illustration of a wall mount 300 that also serves as an antenna, according to an exemplary embodiment of the disclosure. Wall mount 300 is another example of a wall mount with an integrated antenna. Wall mount 300 includes a mounting base 310 in the form of a frame with an antenna design 330 integrated therein as in wall mount 100 (e.g. provided as an integral part or attached to the mounting base 310). Optionally, a cable 340 is attached to antenna design 330 (e.g. approximately at the center) to connect to the television screen.

In an exemplary embodiment of the disclosure, wall mount 300 includes two foldable support arms 350 (e.g. with single or double joints) that extend from opposite sides of wall mount frame 310 to support the television screen. Optionally, wall mount 300 includes a tightening screw 355 on each of the foldable support arms 350 to lock the position of the foldable support arm 350. In an exemplary embodiment of the disclosure, a screen interface plate 320 is attached to an end of the foldable support arms 350 with screen interface arms 360 rotatably attached to the screen interface plate 320 to hold the television screen. The screen interface arms 360 include slits 365 for positioning a screw to couple the screen interface arms 360 to the television screen.

As with wall mount 100 the antenna design 330 is integrated into the frame of mounting base 310 to enhance stability of the wall mount 300 and to enhance reception of the antenna. Optionally, the frame of mounting base 310 is cut forming a gap 315 in the mounting base 310 to enhance reception of the antenna.

Figure 4:
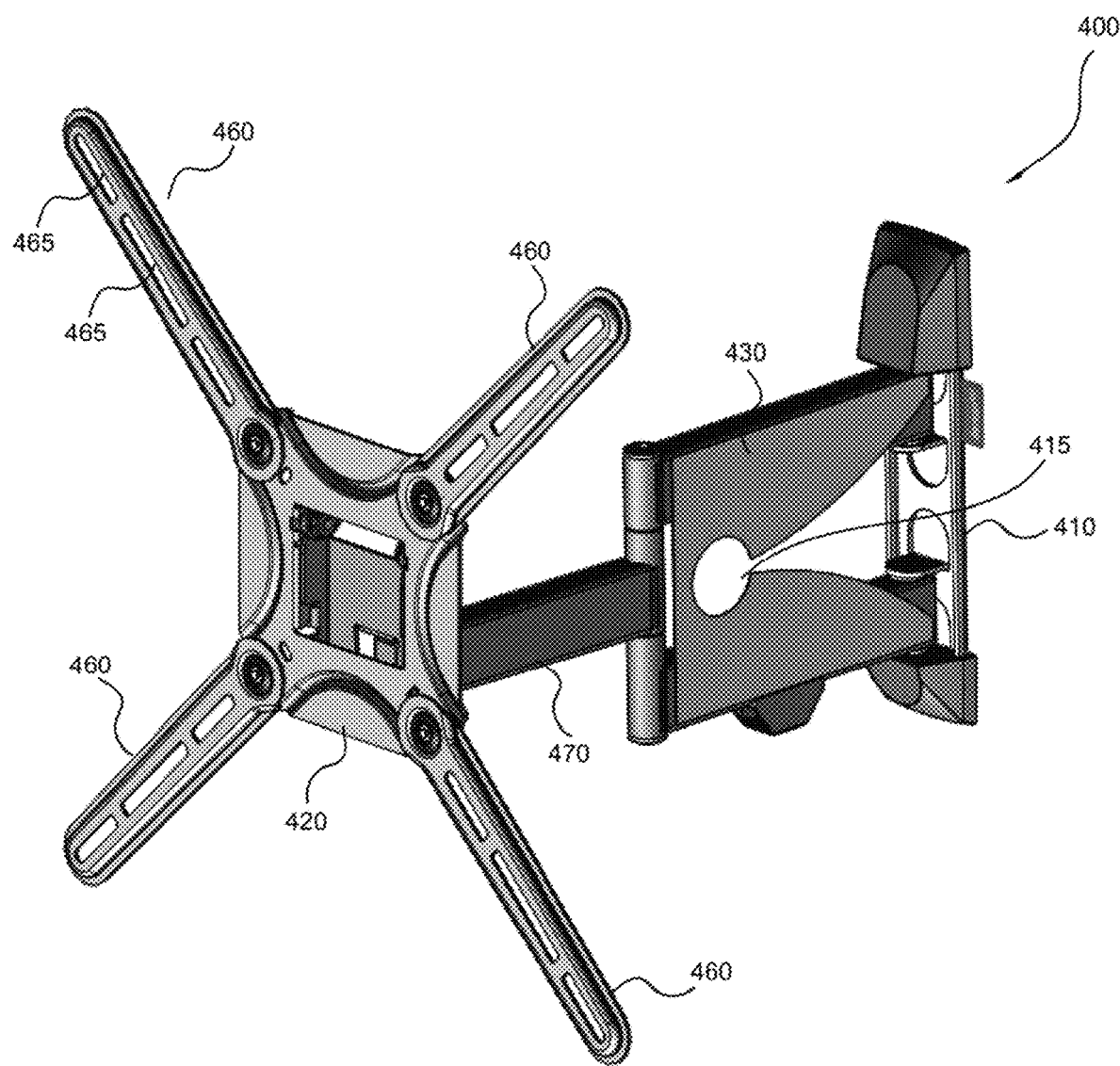
FIG. 4 is a schematic illustration of an alternative wall mount that also serves as an antenna, according to an exemplary embodiment of the disclosure.

FIG. 4 is a schematic illustration of a wall mount 400 that also serves as an antenna, according to an exemplary embodiment of the disclosure. Wall mount 400 includes a mounting base 410 for attaching to the wall. Optionally, an antenna design support arm 430 is rotatably coupled to mounting base 410. The antenna design support arm 430 is shaped as an antenna and serves as an arm supporting a television screen and as an antenna to receive television transmissions. Optionally, antenna design support arm has a cut out portion forming a gap 415 in the center to enhance transmission reception. Likewise a cable (not shown) may be connected to the antenna design support arm 430 to transfer a received signal to the television screen.

In an exemplary embodiment of the disclosure, an extension arm 470 extends from antenna support arm 430 to hold a screen interface plate 420. The screen interface plate 420 includes screen interface arms 460 that are rotatably attached to the screen interface plate 420 to adjust and hold the television screen. The screen interface arms 460 include slits 465 for positioning screws or pins to couple the screen interface arms 460 to the television screen.

Figure 5:
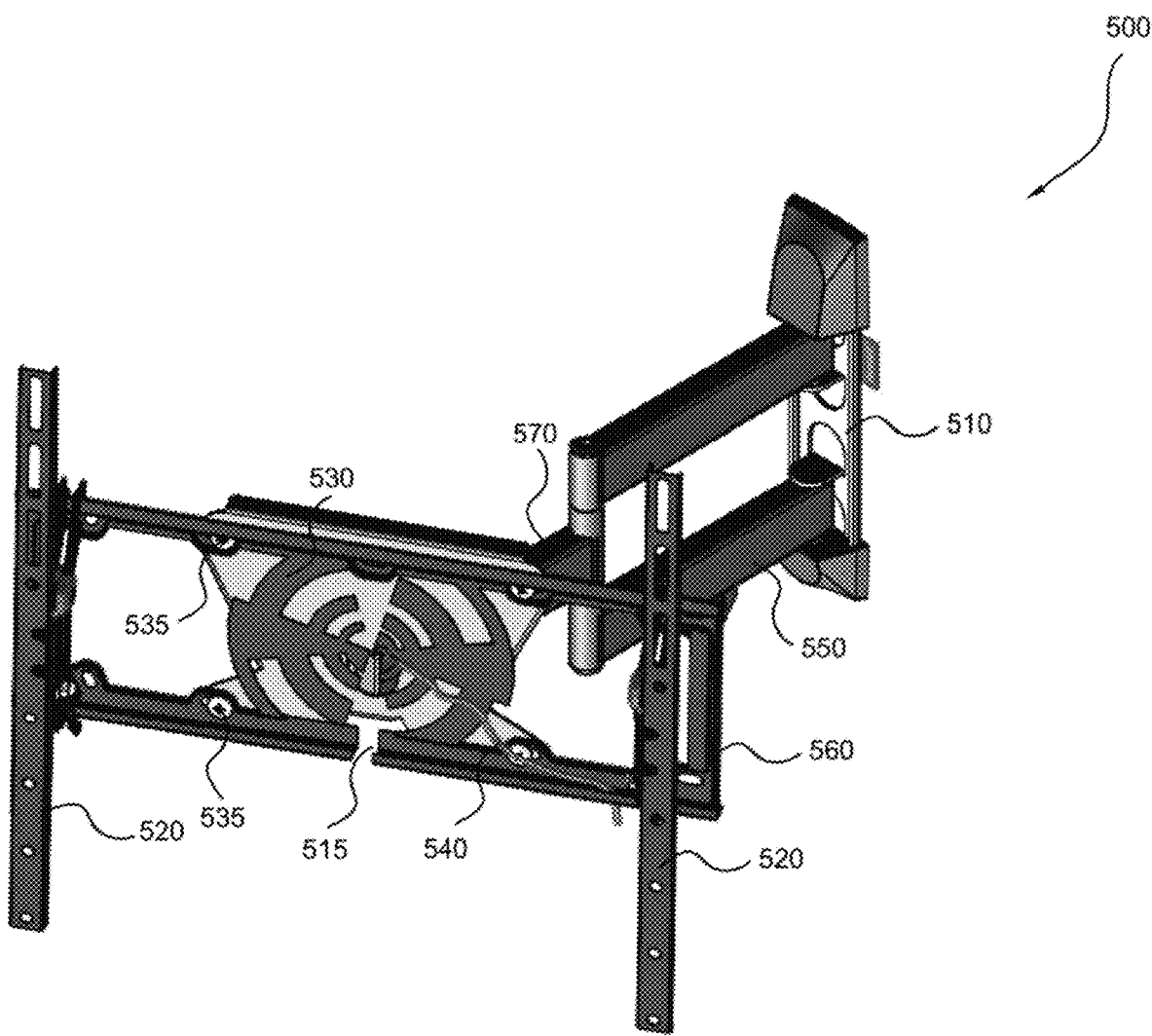
FIG. 5 is a schematic illustration of an alternative wall mount that also serves as an antenna, according to an exemplary embodiment of the disclosure.

FIG. 5 is a schematic illustration of a wall mount 500 that also serves as an antenna, according to an exemplary embodiment of the disclosure. Wall mount 500 includes a mounting base 510 for attaching wall mount 500 to the wall. A support arm 550 is rotatably connected to the mounting base 510. Optionally, a frame support arm 570 is provided to hold a screen interface frame 560 and is coupled (rotatably or not rotatably) to support arm 550.

In an exemplary embodiment of the disclosure, one or more screen interfaces 520 are provided to be connected to the back of a television screen to hang the television screen from screen interface frame 560. Optionally, as in mounting base 110 of wall mount 100 screen interface frame 560 includes an antenna design 530 that serves as an antenna for receiving television signals. The antenna design 530 may be an integral part of the screen interface frame 560 or may be connected for example with clips or screws, nuts and bolts 535 or other means.

In an exemplary embodiment of the disclosure, frame support arm 570 is attached either directly to the screen interface frame 560 or is attached to antenna design 530 that is attached to screen interface frame 560.

In an exemplary embodiment of the disclosure, a cable 540 may be coupled to the antenna design 530 to provide a received signal from the antenna design 530 to an antenna socket of the television screen.

In some embodiments of the disclosure, screen interface frame 560 may be cut to form a gap 515 (e.g. matching gaps in antenna design 530) to enhance reception by antenna design 530. Likewise antenna design 530 may be connected to screen interface frame 560 with multiple connectors to strengthen the structure of screen interface frame 560.

In summary the above embodiments include wall mounts having an antenna as part of a mounting base, part of a support arm or part of a screen interface that is held by a support arm. Alternatively, other parts and positions of the wall mount may be structured as an antenna. In an exemplary embodiment of the disclosure, the antenna is confined within a frame or serves independently as a part of the wall mount.

Likewise a wall mount with an antenna in multiple positions may be provided, for example having the screen interface frame 560 and the support arm 550 or 410 both designed as antennas.

In some embodiments of the disclosure, the entire wall mount may be made from metal to enhance reception. Alternatively, some of the wall mount parts (e.g. excluding the antenna part) may be made from other materials such as rubber or plastic to isolate signals received by the antenna and prevent signal noise.

Analog and digital television broadcasts cover a wide range of frequencies, for example 40 MHz to about 900 MHz. optionally, the size and thickness of the antenna part of the wall mount may be selected to match a desired frequency range, for example the antenna design part may be made from a thicker metal or thinner metal than the rest of the wall mount or the antenna design part may be enlarged relative to a wall mount that does not serve as an antenna. Additionally, the antenna part of the wall mount may be made from a different metal than the rest of the wall mount, for example from copper.

Television broadcasts are generally transmitted from a transmission tower and propagate in all directions. Optionally, the antenna design for use with the wall mount is selected to optimize reception of desired frequencies. In some embodiments of the disclosure, multiple designs may be used together to optimize reception.

Television transmissions have vertical polarization, therefore an antenna with vertical polarization will have better reception than other antennas. An antenna with circular polarization will only receive half of the intensity of the transmission and an antenna with horizontal polarization will not receive a signal at all. Additionally a good television antenna generally has an impedance that is close to 75 Ohm. Optionally, the impedance may be controlled by adding a matching circuit into the antenna design used for the wall mount.

Some common antenna designs for television reception include:

1. A bow tie antenna;
2. A log-periodic tooth antenna—for example as shown in FIGS. 1, 2, 3 and 5;
3. A dipole antenna;
4. A monopole antenna;
5. A slot antenna;
6. A loop antenna;
7. A Vivaldi antenna—for example as shown in FIG. 4.

Optionally, the antenna used in the wall mount may comprised from one or more of the above designs.

In an exemplary embodiment of the disclosure, the wall mount is provided to a user as a constructible kit, which can be coupled to a wall and assembled by a user for hanging a television screen on the wall.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A wall mount kit for mounting a television screen on a wall, comprising:
   a mounting base configured to be attached to the wall;
   a screen interface that is configured to be attached to the television screen;
   wherein the screen interface is connectable directly or indirectly with an arm to the mounting base;
   wherein at least one of the mounting base, the screen interface or the arm comprises metal and is configured to serve as a functional part of the wall mount and also as an antenna;
   wherein the wall mount cannot support the television screen without the functional part; and
   wherein the antenna is configured as a log-periodic tooth antenna with a cut rectangular frame; wherein the frame has a height that is smaller than a diameter of the log-periodic tooth antenna; and the frame has a width that is larger than the diameter of the log-periodic tooth antenna.

2. A wall mount kit according to claim 1, wherein the antenna is confined within the frame in the wall mount kit.

3. A wall mount kit according to claim 2, wherein the frame is cut to form a gap in the frame matching a gap in the antenna.

4. A wall mount kit according to claim 2, wherein the frame and the antenna confined within the frame are both configured to be attached to the wall.

5. A wall mount kit according to claim 1, wherein the antenna includes a cable for providing a signal to the television screen.

6. A wall mount kit according to claim 1, wherein the antenna is confined within the contour of the wall mount, thus not increasing the volume of the wall mount with additional parts that are not needed for the wall mount.

7. A wall mount kit according to claim 1, wherein the screen interface is connected by the arm to the mounting base and two or more of the mounting base, the screen interface and the arm are configured to serve as the antenna.

8. A wall mount kit according to claim 1, wherein the antenna is made from a different metal than other parts of the wall mount.

9. A wall mount kit according to claim 1, wherein the antenna is made from a thicker or thinner metal than other parts of the wall mount.

10. A method of assembling a wall mount kit, comprising:
attaching a wall mount mounting base to a wall;
coupling a screen interface to a television screen;
connecting the screen interface directly or indirectly with an arm to the mounting base;
wherein at least one of the mounting base, the screen interface or the arm comprises metal and is configured to serve as a functional part of the wall mount and also as an antenna;
wherein the wall mount cannot support the television screen without the functional part; and
wherein the antenna is configured as a log-periodic tooth antenna with a cut rectangular frame; wherein the frame has a height that is smaller than a diameter of the log-periodic tooth antenna and the frame has a width that is larger than the diameter of the log-periodic tooth antenna.

11. A method according to claim 10, wherein the antenna is confined within the frame in the wall mount kit.

12. A method according to claim 11, wherein the frame is cut to form a gap in the frame matching a gap in the antenna.

* * * * *